US012627184B2

(12) United States Patent
Riedisser et al.

(10) Patent No.: US 12,627,184 B2
(45) Date of Patent: May 12, 2026

(54) ROTOR ASSEMBLY FOR AN ELECTRIC MACHINE

(71) Applicant: ZF Friedrichshafen AG, Friedrichshafen (DE)

(72) Inventors: Thomas Riedisser, Sigmarszell (DE); Matthias Weidner, Wasserlosen (DE); Peter Fenn, Waigolshausen (DE); Florian Pöhnlein, Stefansfeld (DE); Claudius Flogaus, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 192 days.

(21) Appl. No.: 18/559,265

(22) PCT Filed: May 3, 2022

(86) PCT No.: PCT/EP2022/061808
§ 371 (c)(1),
(2) Date: Nov. 6, 2023

(87) PCT Pub. No.: WO2022/233845
PCT Pub. Date: Nov. 10, 2022

(65) Prior Publication Data
US 2024/0235300 A1 Jul. 11, 2024

(30) Foreign Application Priority Data
May 6, 2021 (DE) .......................... 102021204575.8

(51) Int. Cl.
*H02K 1/28* (2006.01)
*H02K 7/00* (2006.01)

(52) U.S. Cl.
CPC ............... *H02K 1/28* (2013.01); *H02K 7/006* (2013.01)

(58) Field of Classification Search
CPC .......... H02K 1/28; H02K 7/006; H02K 7/108; H02K 1/30
See application file for complete search history.

(56) References Cited

U.S. PATENT DOCUMENTS

2013/0154415 A1* 6/2013 Origlia ................. H02K 1/2791
310/89
2013/0193802 A1* 8/2013 Miyaoka ............... F16D 25/082
29/598

(Continued)

FOREIGN PATENT DOCUMENTS

DE 101 55 048 A1 5/2003
DE 10 2006 013 099 A1 3/2007

(Continued)

OTHER PUBLICATIONS

International Search Report and Written Opinion received for Application No. PCT/EP2022/061808 mailed Aug. 8, 2022 (10 pages).

(Continued)

*Primary Examiner* — Thomas Truong
(74) *Attorney, Agent, or Firm* — Crowell & Moring LLP

(57) ABSTRACT

Proposed is a rotor assembly for an electric machine, having a rotor that comprises a laminated-core support, a rotor support and a rotor hub, the rotor support being approximately in the form of a disk and being provided with at least one circumferential annular rib portion to increase rigidity. An electric machine having a rotor assembly is also proposed. Additionally proposed are a hybrid automatic transmission and an electrically driven axle, both of which are equipped with a rotor assembly.

17 Claims, 4 Drawing Sheets

(56) References Cited

U.S. PATENT DOCUMENTS

| 2017/0203643 A1 * | 7/2017 | Suyama | F16D 25/10 |
| 2018/0219446 A1 * | 8/2018 | Yamada | H02K 5/1737 |

FOREIGN PATENT DOCUMENTS

| DE | 10 2012 008 016 A1 | 10/2013 |
| DE | 10 2013 215 790 A1 | 2/2015 |
| DE | 11 2015 002 458 T5 | 2/2017 |
| DE | 10 2016 211 940 A1 | 1/2018 |
| DE | 10 2016 211 945 A1 | 1/2018 |
| DE | 10 2017 210 571 A1 | 12/2018 |
| DE | 10 2018 211 376 A1 | 1/2020 |
| DE | 10 2019 202 563 A1 | 8/2020 |
| DE | 10 2020 210 497 A1 | 2/2022 |
| WO | WO 2017/076520 A1 | 5/2017 |

OTHER PUBLICATIONS

Office Action dated Apr. 27, 2022 for German Patent Application No. 10 2021 204 575.8 (16 pp.), note: pp. 1 and 2 are English language Explanations to Section C. Result of Determination Document.
Oehler G., Weber, A.: "Steife Blech- und Kunststoffkonstruktionen," Springer-Verlag Berlin Heidelberg 1972 (Konstruktionsbucher Band 30). S. 11, 12, 36, 37, 74, 75—ISBN 978-3-540-05635-5 (180 pp.) (uploaded in three sections due to size).

* cited by examiner

ROTOR ASSEMBLY FOR AN ELECTRIC MACHINE

CROSS-REFERENCE TO RELATED APPLICATIONS

This application is a U.S. national stage application under 35 U.S.C. § 371 of PCT Application No. PCT/EP2022/061808, filed on May 3, 2022, and published as WO 2022/233845 A1 on Nov. 10, 2022, which claims priority from German Application No. DE 10 2021 204 575.8, filed on May 6, 2021, the entirety of which are each hereby fully incorporated by reference herein.

The present invention relates to a rotor arrangement for an electric machine according to the type defined in greater detail in the preamble of patent claim 1. The invention further relates to an electric machine having a rotor arrangement and a hybrid automatic gear mechanism of a vehicle and an electrically driven axle of a vehicle having a rotor arrangement in each case.

Document DE 10 2016 211 940 A1 discloses, for example, a hybrid drive module for a motor vehicle drive train having an electric machine in a housing of a hybrid automatic gear mechanism. The electric machine is arranged coaxially relative to a central gear mechanism shaft, wherein a plate switching element is provided radially inside a metal sheet assembly carrier of a rotor of the electric machine. The metal sheet assembly carrier is rotatably supported on the central gear mechanism shaft by means of a rotor carrier and a rotor hub.

In order to optimize the efficiency of the electric machine, the smallest possible air gap is provided between the stator and the rotor of the electric machine in order to thereby bring about a positive effect on the degree of efficiency of the electric machine since the losses increase as the air gap increases. With a decreasing air gap, however, the static magnetic force with which the permanent magnets in the metal sheet assembly carrier of the rotor are attracted to the stator also increases. With ideal coaxiality theoretically over 360°, these static magnetic forces are identical and opposed in terms of their vector magnitude and therefore balanced in terms of force.

However, as soon as the rotor is displaced from the center relative to the stator and the air gap consequently becomes unequal, the magnetic forces increase at the narrow location and decrease at the location with the larger air gap. This effect leads to a single-sided radial loading of the rotor. Consequently, a curvature or a bend is produced on the disk-like rotor carrier. This axial curvature of the planar face on the rotor carrier leads to a radial inclination of the entire rotor within the air gap. For this reason, the rotor carrier is accordingly generally configured to be thick-walled or solid. However, this leads to considerable additional weight and additional costs and to an undesirably high structural space requirement.

An object of the present invention is to provide a rotor arrangement and an electric machine and a hybrid automatic gear mechanism and an electric drive axle which provide a configuration of a rotor carrier which is optimized in terms of rigidity for increasing the degree of efficiency with the lowest possible production costs and lowest possible structural space requirement.

This object is achieved according to the invention by the features of patent claims 1 and 7 or 8 and 10. Advantageous and claimed further developments will be appreciated from the respective dependent claims and the description and the drawings.

Consequently, a rotor arrangement for an electric machine having a rotor which comprises a metal sheet assembly carrier and a rotor carrier and a rotor hub is proposed. In order in particular to achieve a configuration of the rotor carrier which is optimized in terms of rigidity, there is provision for the substantially disk-like rotor carrier to have at least one circumferential annular rib portion or an annular rib in order to increase rigidity.

With the proposed rotor arrangement, as a result of the annular rib portion provided, there is brought about a clear stiffening of the planar face or the disk-ring-like region of the rotor carrier. The effect of the annular rib portion reduces the curvature of the entire disk-like rotor carrier as a result of the high level of annular rigidity of the annular rib portion since a torsion resulting from the ring closure and the build-up of tension/compression stresses is not permitted. The axial curvature of the rotor carrier is also thereby reduced, which consequently also prevents a radial inclination of the entire rotor with respect to the stator which is fixed to the housing.

In the context of the invention, there is provision for the annular rib portion to be provided over the entire circumference and so as to protrude in an axial direction on the rotor carrier. The annular rib portion consequently produces virtually a 360° circumferential geometric element, which is as far as possible axially elongate and at the same time has a relatively small radial height.

The arrangement position of the annular rib portion on the rotor carrier is determined at locations where the largest loading is produced. This arrangement position is located when viewed radially between the metal sheet assembly carrier and the rotor hub on the rotor carrier.

Various embodiments are conceivable in order to produce the annular rib portion on the rotor carrier of the proposed rotor arrangement. A particularly cost-effective configuration is produced in that the annular rib portion is formed by means of a U-shaped formation. The U-shape is configured in technical shaping terms as a dual wall which, for example, is produced by means of continuous shaping and reshaping of the metal sheet directly from the disk-like rotor carrier. The U-shape forms as far as possible an axially elongate configuration with the smallest possible radial height which produces a maximum increase of rigidity for the rotor carrier in a cost-effective manner.

However, it is also conceivable for the annular rib portion to be provided as a materially reinforced region by means of forging or the like on the rotor carrier. Another possibility in the context of the invention for producing the annular rib portion may make provision for the annular rib portion to be, for example, welded as a separate component on the rotor carrier.

Another aspect of the present invention involves claiming an electric machine having the above-described rotor arrangement. The advantages described above and other advantages are thereby afforded.

Furthermore, the present invention also claims a hybrid automatic gear mechanism of a vehicle having the above-described rotor arrangement.

Preferably, an automatic gear mechanism is consequently claimed, in which in a housing an electric machine having the proposed rotor arrangement is arranged coaxially relative to a centrally arranged gear mechanism shaft, wherein radially inside a metal sheet assembly carrier of the rotor of the electric machine a plate switching element or the like is arranged and wherein a rotor carrier is arranged axially between a plate carrier of the plate switching element and a pre-transmission. In order to increase the rigidity of the rotor without additional structural spatial requirement, there is provision for an annular rib portion of the rotor carrier to be arranged in a state radially nested in a formation of the plate carrier.

Furthermore, an electrically driven axle or a purely electric drive with the above-described rotor arrangement is also claimed by the present invention.

The present invention is explained in greater detail below with reference to the drawings.

In FIGS. 1 to 5, a rotor arrangement according to the invention for an electric machine 9 is illustrated by way of example with reference to different variants and a hybrid automatic gear mechanism according to the invention having an electric machine 9 by way of example.

Figure 1:
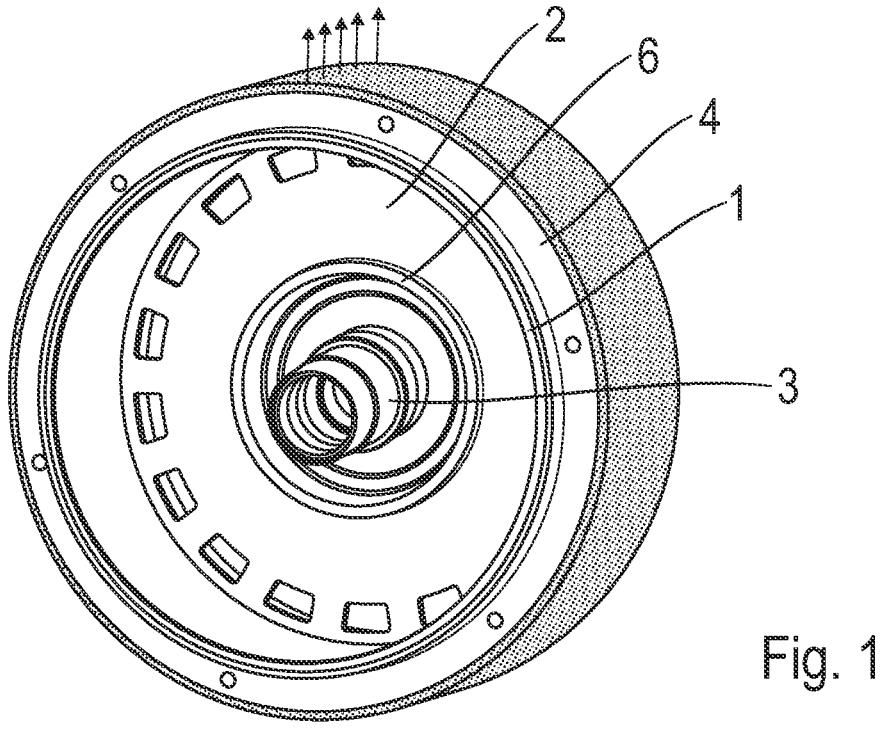
FIG. 1 shows a schematic three-dimensional view of a rotor arrangement according to the invention of an electric machine.
Figure 2:
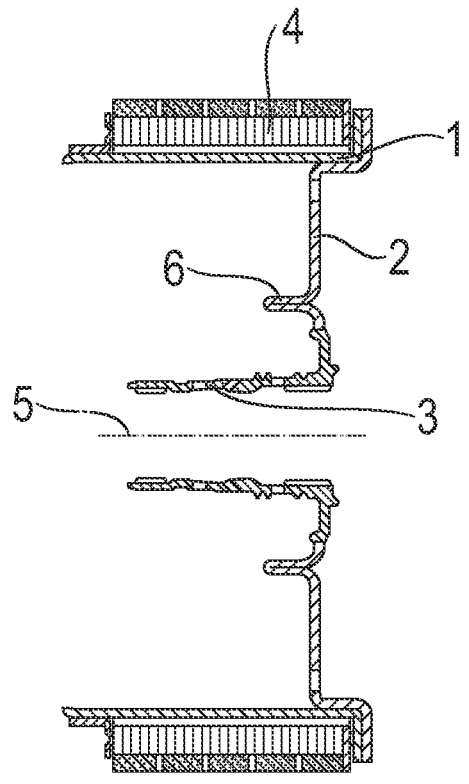
FIG. 2 shows a schematic sectioned view of the rotor arrangement.

In FIGS. 1 and 2, a detailed view of a rotor arrangement according to the invention for an electric machine is illustrated. The proposed rotor arrangement comprises a multi-component rotor which comprises a metal sheet assembly carrier 1 and a rotor carrier 2 and a rotor hub 3. There is pressed onto the metal sheet assembly carrier 1 a metal sheet assembly 4 which is provided with a plurality of permanent magnets which are arranged in a state distributed over the circumference. The metal sheet assembly carrier 1 is as a formed sheet metal component in turn connected to the rotor carrier 2 as a formed sheet metal component, for example, by means of riveting, screwing or by means of welding. The rotor carrier 2 is configured in a disk-like manner and is welded to the rotor hub 3 as a rotary component. The rotor hub 3 is, for example, connected to a gear mechanism shaft 3 in a rotationally secure manner or, as in the case illustrated in this instance, radially supported on the gear mechanism shaft 5 and via the ring gear of the pre-transmission 11 connected with respect to the gear mechanism shaft 5 by means of the planetary carrier in a rotationally secure manner.

In FIG. 1, the static magnetic forces are indicated schematically by means of arrows. In order to produce an increase in rigidity for the disk-like rotor carrier 2 in a manner which is favorable in terms of structural space and production, there is provision for the rotor carrier 2 to have at least one circumferential, axially protruding annular rib portion 6 in order to increase rigidity.

In FIG. 2, for example, the annular rib portion 6 is in the context of a first variant of the invention configured by means of a U-shaped formation as a dual-wall. The annular rib portion 6 extends over the entire circumference of the planar face of the rotor carrier 2, that is to say, over 360°. Furthermore, the annular rib portion 6 is configured so as to protrude in an axial direction from the planar face of the rotor carrier 2, as can be seen in particular in FIGS. 1 and 2.

With regard to the arrangement position of the annular rib portion 6 on the rotor carrier 2, there is provision for the annular rib portion 6 when viewed radially to be arranged between the metal sheet assembly carrier 1 and the rotor hub 3 on the rotor carrier 2. Preferably, the annular rib portion 6 is arranged radially outside a weld seam 13 between the rotor carrier 2 and the rotor hub 3 so that, as a result of the annular rib rigidity, the deformation of and consequently also the damage to the weld seam 13 is reduced.

Figure 3:
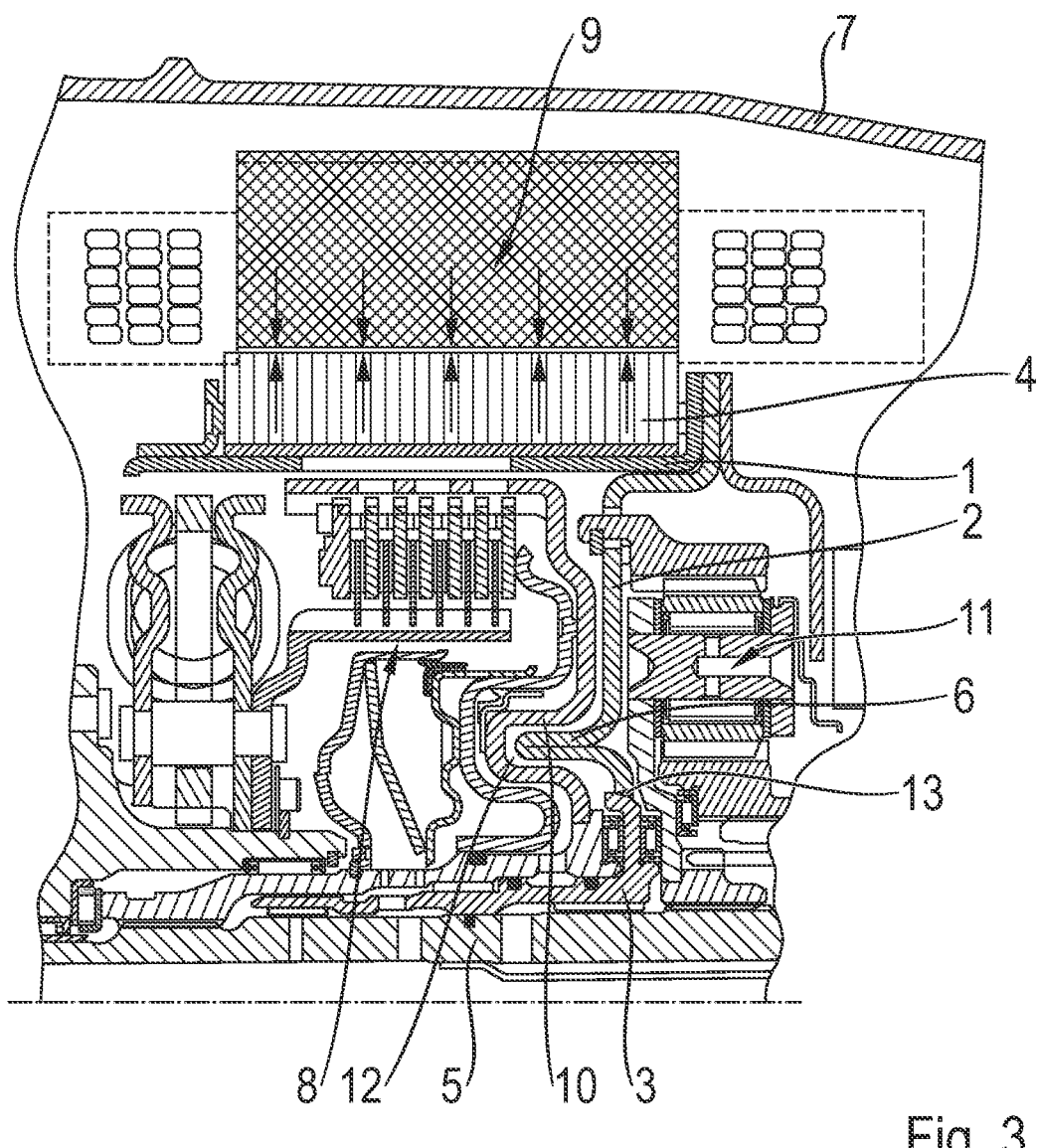
FIG. 3 shows a schematic sectioned partial view of a hybrid automatic gear mechanism with the rotor arrangement according to the invention in a first variant.
Figure 4:
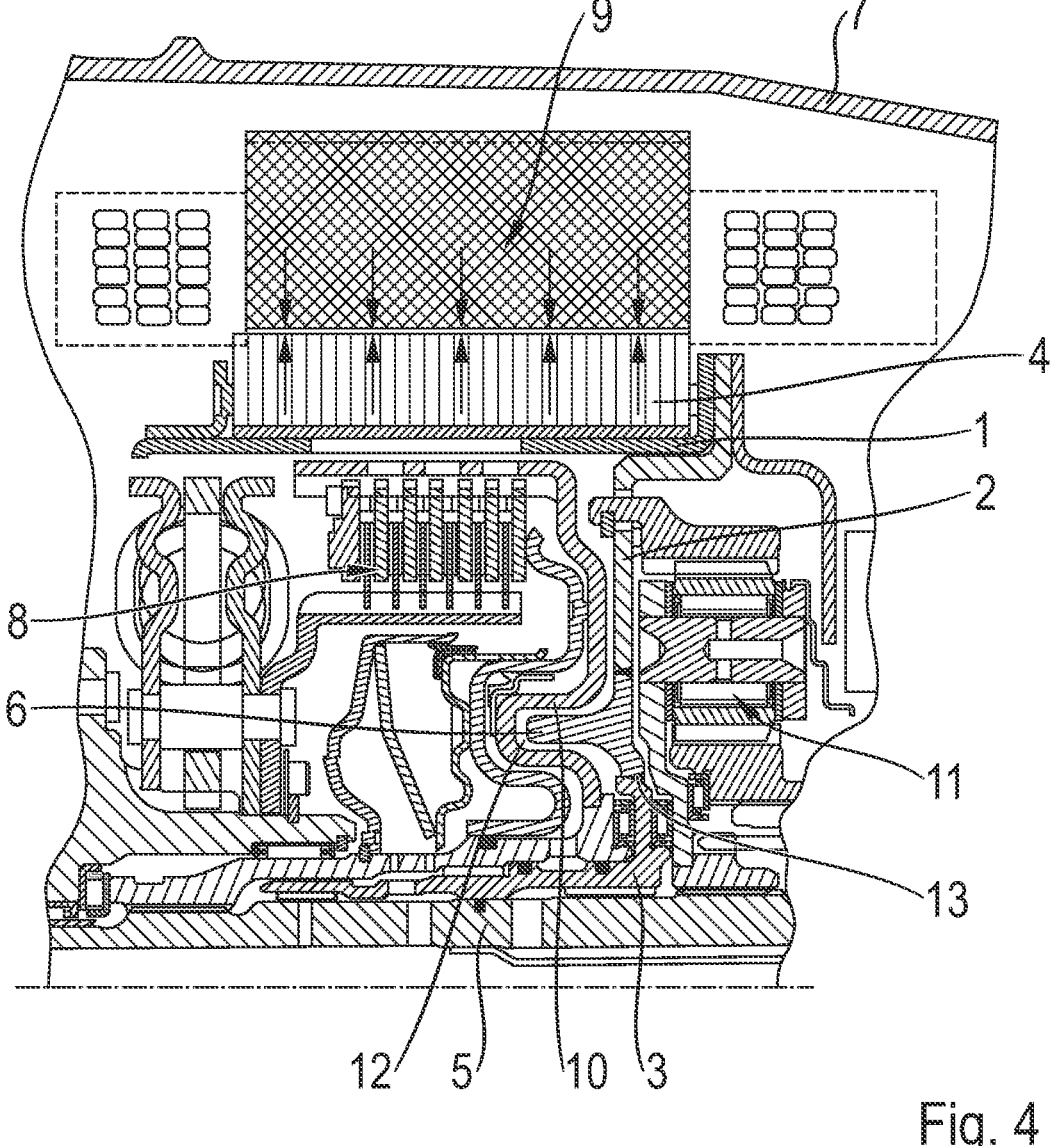
FIG. 4 shows a schematic sectioned part-view of the automatic gear mechanism with the rotor arrangement in a second variant.
Figure 5:
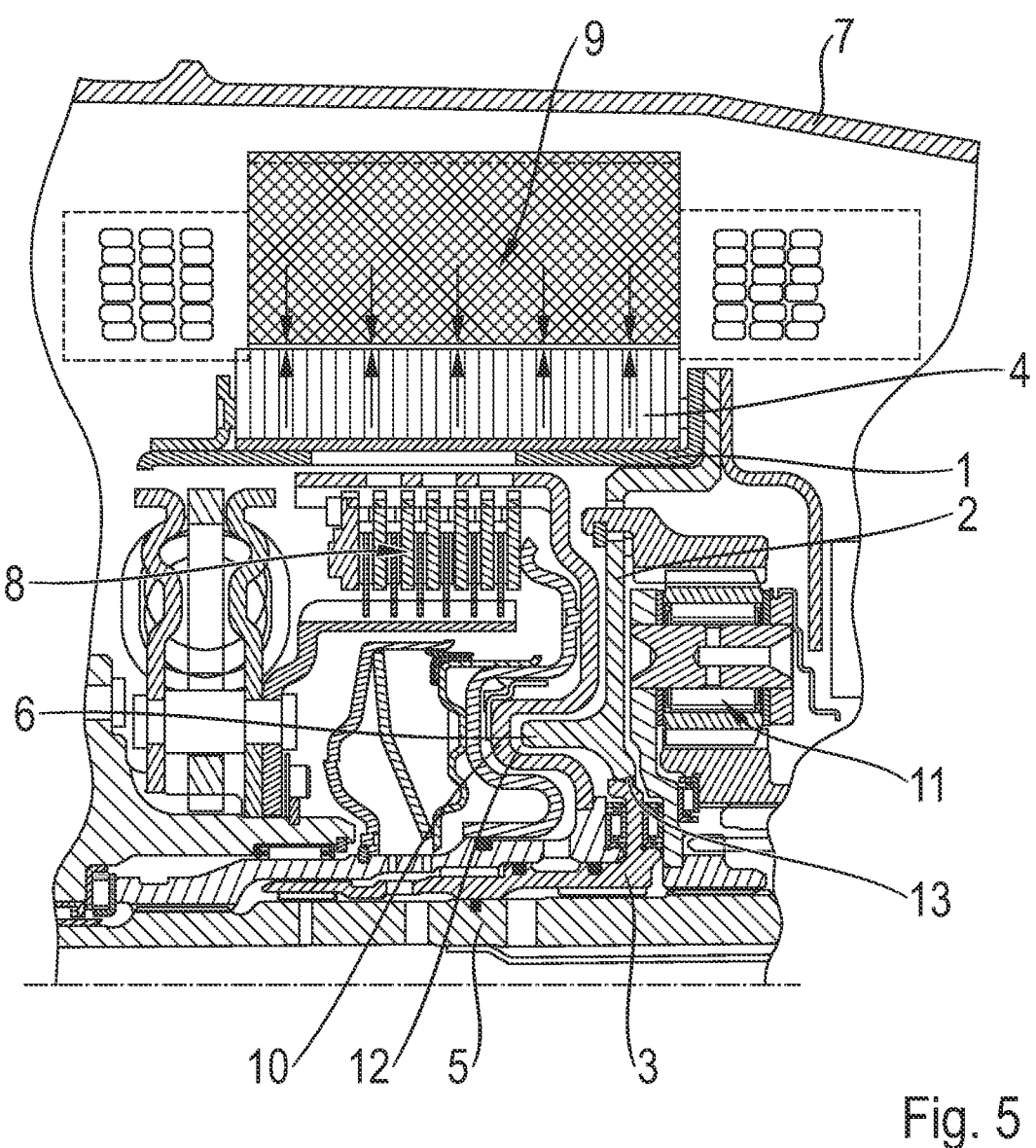
FIG. 5 shows a schematic sectioned view of the automatic gear mechanism with the rotor arrangement in a third embodiment.

In FIGS. 3 to 5, various variants of the rotor arrangement according to the invention are illustrated by way of example with reference to a hybrid automatic gear mechanism which is also claimed.

The automatic gear mechanism has a housing 7 in which the electric machine 9 is arranged with the rotor arrangement coaxially relative to a centrally arranged gear mechanism shaft 5. The rotor arrangement of the electric machine 9 is radially supported via the rotor hub 3 on the gear mechanism shaft 5 and connected to the gear mechanism shaft 5 in a rotationally secure manner by means of the pre-transmission 11. Furthermore, a plate switching element 8 is arranged in the housing 7 radially inside the electric machine 9, that is to say, radially inside the rotor and the stator of the electric machine 9. Consequently, the plate switching element 8 and the electric machine 9 are arranged in a state radially nested in the housing 7.

As can be seen in FIGS. 3 to 5, the rotor carrier 2 of the rotor arrangement according to the invention is arranged axially between a plate carrier 10 of the plate switching element 8 and a pre-transmission 11.

In order to produce an arrangement which is neutral in terms of structural space for the annular rib portion 6 on the rotor carrier 2 of the rotor arrangement of the electric machine 9 in the housing 7 of the automatic gear mechanism, there is provision for the annular rib portion 6 of the rotor carrier 2 to be arranged in a state radially nested in a formation 12 of the plate carrier 10 of the plate switching element 8. The formation 12 is produced by means of a specially configured S-shape or S-stroke in the plate carrier 10 so that this structural space provided for the annular rib portion 6 of the rotor carrier 2 can be used so that no negative effects on the axial and radial structural space result from this. This specially configured S-stroke as an S-shaped formation 12 on the plate carrier 10 of the plate switching element 8 acts at the same time as a geometric stiffening of the plate switching element 8 and as a sealing seat of an external piston chamber seal.

In FIG. 3, the annular rib portion 6 of the rotor carrier 2 is formed in the context of a first configuration by means of a U-shaped formation. In FIG. 4, a second configuration of the annular rib portion 6 of the rotor carrier 2 of the electric machine 9 in the automatic gear mechanism is illustrated, wherein the annular rib portion 6 is provided as a materially reinforced region by means of forging on the rotor carrier 2. Finally, FIG. 5 shows a third configuration of the annular rib portion 6 of the rotor carrier 2 in the automatic gear mechanism, wherein the annular rib portion 6 is welded to the rotor carrier 2 as a separate component.

REFERENCE NUMERALS

1 Metal sheet assembly carrier
2 Rotor carrier
3 Rotor hub
4 Metal sheet assembly
5 Gear mechanism shaft
6 Annular rib portion or annular rib
7 Housing
8 Plate switching element 9 Electric machine
10 Plate carrier
11 Pre-transmission
12 S-shaped formation
13 Weld seam

The invention claimed is:

1. A hybrid automatic gear mechanism of a vehicle comprising:
a rotor arrangement for an electric machine, the rotor arrangement comprising:
a rotor which comprises a metal sheet assembly carrier and a rotor carrier and a rotor hub,
wherein the rotor carrier is substantially disk-like and has at least one circumferential annular rib portion configured to increase rigidity; and
a housing having therein:
at least one electric machine arranged coaxially relative to a centrally arranged gear mechanism shaft; and
a plate switching element arranged radially inside a rotor of the electric machine,
wherein the rotor carrier of the rotor is arranged axially between a plate carrier of the plate switching element and a pre-transmission in the housing, and
wherein the annular rib portion of the rotor carrier is arranged in a state radially nested in a formation of the plate carrier.

2. The hybrid automatic gear mechanism according to claim 1, wherein the annular rib portion is provided over an entire circumference and protrudes in an axial direction on the rotor carrier.

3. The hybrid automatic gear mechanism according to claim 2, wherein the annular rib portion is arranged, when viewed radially between the metal sheet assembly carrier and the rotor hub, on the rotor carrier.

4. The hybrid automatic gear mechanism according to claim 2, wherein the annular rib portion comprises a U-shaped formation.

5. The hybrid automatic gear mechanism according to claim 2, wherein the annular rib portion is provided as a materially reinforced region by means of forging.

6. The hybrid automatic gear mechanism according to claim 2, wherein the annular rib portion is provided as a separate component on the rotor carrier.

7. The hybrid automatic gear mechanism according to claim 1, wherein the annular rib portion is arranged, when viewed radially between the metal sheet assembly carrier and the rotor hub, on the rotor carrier.

8. The hybrid automatic gear mechanism according to claim 7, wherein the annular rib portion comprises a U-shaped formation.

9. The hybrid automatic gear mechanism according to claim 7, wherein the annular rib portion is provided as a materially reinforced region by means of forging.

10. The hybrid automatic gear mechanism according to claim 7, wherein the annular rib portion is provided as a separate component on the rotor carrier.

11. The hybrid automatic gear mechanism according to claim 1, wherein the annular rib portion comprises a U-shaped formation.

12. The hybrid automatic gear mechanism according to claim 11, wherein the annular rib portion is provided as a materially reinforced region by means of forging.

13. The hybrid automatic gear mechanism according to claim 11, wherein the annular rib portion is provided as a separate component on the rotor carrier.

14. The hybrid automatic gear mechanism according to claim 1, wherein the annular rib portion is provided as a materially reinforced region by means of forging.

15. The hybrid automatic gear mechanism according to claim 14, wherein the annular rib portion is provided as a separate component on the rotor carrier.

16. The hybrid automatic gear mechanism according to claim 1, wherein the annular rib portion is provided as a separate component on the rotor carrier.

17. An electrically driven vehicle comprising the hybrid automatic gear mechanism according to claim 1.

* * * * *